United States Patent [19]
Kougiouris et al.

[11] Patent Number: 5,881,286
[45] Date of Patent: Mar. 9, 1999

[54] METHOD AND APPARATUS FOR SPACE EFFICIENT INTER-PROCESS COMMUNICATIONS

[75] Inventors: Panagiotis Kougiouris, Mountain View; Graham Hamilton, Palo Alto, both of Calif.

[73] Assignee: Sun Microsystems, Inc., Mountain View, Calif.

[21] Appl. No.: 797,928

[22] Filed: Feb. 12, 1997

Related U.S. Application Data

[63] Continuation of Ser. No. 279,093, Jul. 22, 1994, abandoned.
[51] Int. Cl.$^6$ ....................................................... G06F 9/40
[52] U.S. Cl. ............................................................... 395/684
[58] Field of Search ............................................. 395/684

[56] References Cited

U.S. PATENT DOCUMENTS

| | | | |
|---|---|---|---|
| 5,218,699 | 6/1993 | Brandle et al. | 395/684 |
| 5,307,490 | 4/1994 | Davidson et al. | 395/684 |
| 5,321,841 | 6/1994 | East et al. | 395/677 |
| 5,430,876 | 7/1995 | Schreiber et al. | 395/684 |
| 5,434,995 | 7/1995 | Oberlin et al. | 395/553 |
| 5,446,901 | 8/1995 | Owicki et al. | 311/154 |
| 5,491,800 | 2/1996 | Goldsmith et al. | 395/200.51 |
| 5,497,463 | 3/1996 | Stein et al. | 395/200.03 |
| 5,511,197 | 4/1996 | Hill et al. | 395/683 |

OTHER PUBLICATIONS (no month given) Sparc Architecture Manual, Version 8, 1992, pp. 102–103.

Tucker, Allen, B., "Programming Languages", second edition, McGraw–Hill, pp. 486–489, 1986.

Tanenbaum, Andrew S., Modern Operating Systems, Prentice Hall, pp. 418, 434–442, 1992.

Nelson, B. J., "Remote Procedure Call", Ph.D. thesis, Carnegie–Mellon University, p. 115, 1981.

*Primary Examiner*—Lucien U. Toplu
*Assistant Examiner*—St. John Courtenay, III
*Attorney, Agent, or Firm*—Blakely Sokoloff Taylor & Zafman

[57] ABSTRACT

A computer-implemented method and apparatus in a computer system for inter-process communication. A first procedure allocates a first buffer in a first memory space shared by the first procedure (e.g. a client process) and a second procedure (e.g. a kernel or server process). The first procedure then marshals arguments for communicating with the second procedure in the first buffer. The first procedure indicates that a message for the second procedure is being passed and passes a first reference to the first buffer in the first memory space to the second procedure. The second procedure detects the indication of the message by the first procedure. The second procedure then references the first buffer and copies the arguments contained in the first buffer into a temporary buffer. The second procedure can then deallocate the first buffer. In implemented embodiments of the present invention, inter-process communication is more efficient because the first buffer is deallocated upon receipt of the communication by the second process.

12 Claims, 8 Drawing Sheets

Client/Kernel or Kernel/Server Buffer

Client/Kernel or
Kernel/Server Buffer

600

700

800

METHOD AND APPARATUS FOR SPACE EFFICIENT INTER-PROCESS COMMUNICATIONS

This is a continuation of application Ser. No. 08/279,093 filed Jul. 22, 1994, now abandoned.

BACKGROUND OF THE INVENTION

1. Field of the Invention

The present invention relates to computer systems. More specifically, the present invention relates to communication between processes in a computer system.

2. Background Information

Inter-Process communication is a fundamental part of modern day computer system design. Inter-process communication is typically facilitated via a calling scheme in a kernel of the computer system which manages communication between a client and server process. One of the problems associated with such inter-process communication is that typically, when a client task invokes a server task, the client task allocates a certain amount of memory to pass arguments (parameters) to the server task, and that memory is typically used until any arguments are returned from the server. That is, even though control and processing has been passed to the server application, memory is still consumed in the client application until return arguments are returned from the server. Thus, a buffer is allocated which is not used for a large portion of the time in which the server task has been passed control by the client. This especially is an issue in multi-threaded environments wherein a plurality of buffers are allocated, one for each thread. Multiple buffers remain allocated and, for the most part, stay unused for the duration of each thread, unnecessarily consuming memory resources.

A typical prior art scheme for inter-process communication is illustrated with reference to FIG. 1. Typically, a client task (e.g., 110 of FIG. 1) allocates a certain amount of memory space, such as 111, which is typically a buffer or other protected memory space available to the client and kernel processes, and marshals arguments into the buffer area. For the purposes of the remainder of this application "marshaling" refers to the process wherein a client process packages arguments, parameters or other data in a memory area to be passed to the server process. For security reasons, this memory area is typically available only to the client process 110 and the kernel of the operating system 100.

Upon a call to the server process 120 shown in FIG. 1, the kernel detects the call and control is passed to the kernel 100. In this instance, the client typically passes a pointer or a reference to the memory area 111, and the kernel can then access any arguments passed in the buffer 111. Kernel 100 then receives the reference to memory area 111, and copies the arguments contained within memory area 111 into a temporary memory area in kernel 100. A second memory area 101 accessible by the kernel and the server routine 120 may then be used to communicate from kernel 100 to the server 120. The arguments in the temporary buffer are copied into memory area 121. Then, the server routine thread for process 120 is created, and a reference is made to it by kernel 100. The server 120 accepts a reference to memory area 121 from kernel 100, and the server unmarshals the arguments.

While server process 120 is active, after the invocation by kernel 100, buffer 111 is still allocated in client 110. In certain prior art applications, buffers for marshaling arguments are on the order of five kilobytes in length. The client maintains this memory area open and accessible for the duration of server 120's execution. Upon completion of execution of server 120, a reverse of the client/server calling process described above is performed wherein the server uses its own buffer 121 for marshaling arguments into and a reference is passed to the area to kernel 100. Eventually, return arguments are within the original buffer area 111 contained within client 110. It is only at this time, in typical prior art systems, that the buffers 111 and 121 in both the client and the server are deallocated. Thus, the buffers are allocated and are idle for a long time in which kernel 100 and server process 120 are active and perhaps idle (e.g., awaiting I/O servicing). This is an unnecessary consumption of memory resources. Moreover, in multi-threaded environments, client 110 and server 120 may allocate numerous buffers such as 111 and 121, and maintain these in an allocated state while waiting for control to be returned by their corresponding called processes. This results in a very large and unnecessary consumption of memory resources.

As the number of threads in a computer system increases, the amount of memory consumed by such communication becomes quite significant. Thus, the prior art suffers from several shortcomings.

SUMMARY

A computer-implemented method and apparatus in a computer system for inter-process communication. A first procedure allocates a first buffer in a first memory space shared by the first procedure (e.g. a client process) and a second procedure (e.g. a kernel or server process). The first procedure then marshals arguments for communicating with the second procedure in the first buffer. The first procedure indicates that a message for the second procedure is being passed and passes a first reference to the first buffer in the first memory space to the second procedure. The second procedure detects the indication of the message by the first procedure. The second procedure then references the first buffer and copies the arguments contained in the first buffer into a temporary buffer. The second procedure can then deallocate the first buffer. In implemented embodiments of the present invention, inter-process communication is more efficient because the first buffer is deallocated upon receipt of the communication by the second procedure.

The second procedure can then process the arguments contained in the temporary buffer. Upon completion of processing the arguments, the second procedure then allocates a second buffer in the first memory space for marshaling return arguments. The second procedure returns and passes a second reference to the second buffer to the first procedure. The first procedure detects the return to the first procedure and unmarshals the arguments in the second buffer. The first procedure deallocates the second buffer and continues execution. In implemented embodiments of the present invention, the first memory space is preallocated to a first size prior to the calling of the second procedure by the first procedure wherein the first memory space references a first number of buffers. Each of the first number of buffers may be allocated by the first or the second procedure by indicating that buffers are in use by the first or the second procedure. Indication of each of the first number of buffers being in use by the first procedure or the second procedure is performed via an atomic swap between an allocation flag and a value indicating that a buffer is in use, wherein the allocation flag is used for indicating whether one of the first number of buffers is in use.

Other features and advantages of the present invention will be apparent from the description and figures which follow below.

BRIEF DESCRIPTION OF THE DRAWINGS

The present invention is illustrated by way of example and not limitation in the figures of the accompanying in which like references indicate like elements and in which.

DETAILED DESCRIPTION

The present invention provides a more efficient method for inter-process communication, especially in computer systems implementing remote procedure calls. Although the present invention will be described with reference to certain specific embodiments, especially in a general-purpose programmed computer system, it can be appreciated by one skilled in the art that the present invention may be implemented in a variety of systems, without departing from the overall spirit and scope of the present invention. The present invention is implemented as a series of data structures and accompanying instructions implemented in a computer program which is operative within a computer system. Such data structures may be created in a computer system as illustrated in the block diagram of FIG. 2.

Figure 1:
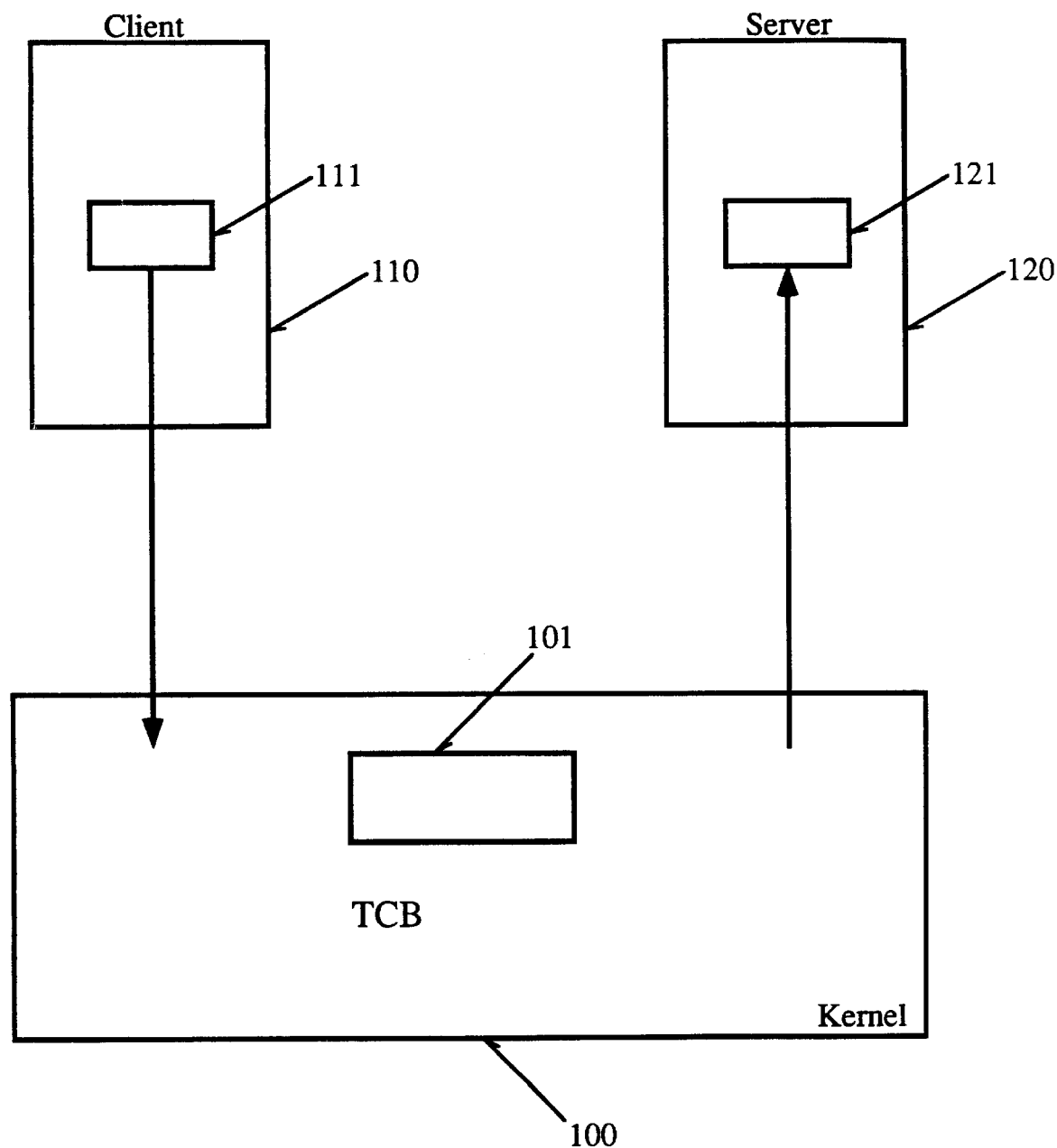
FIG. 1 illustrates a prior art method of inter-process communication.
Figure 2:
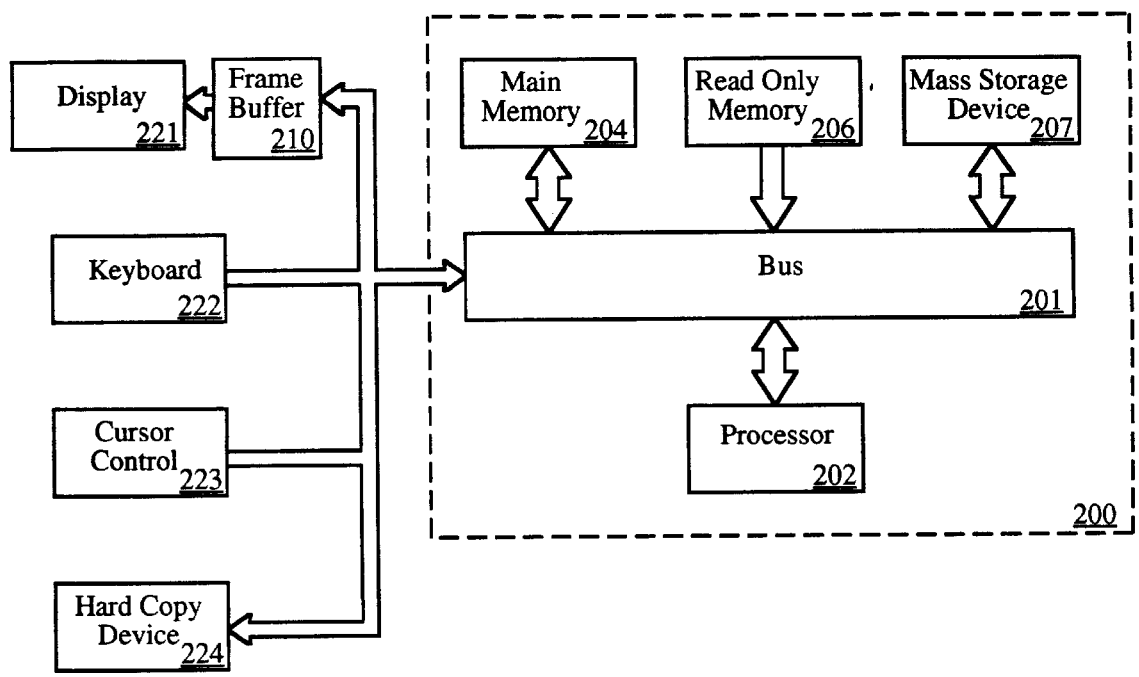
FIG. 2 illustrates a computer system in which embodiments of the present invention may be implemented.

Referring to FIG. 2, a system upon which one implementation of the present invention is implemented is shown as 200. 200 comprises a bus or other communication means 201 for communicating information, and a processing means 202 coupled with bus 201 for processing information. System 200 further comprises a random access memory (RAM) or other volatile storage device 204 (referred to as main memory), coupled to bus 201 for storing information and instructions to be executed by processor 202. Main memory 204 also may be used for storing temporary variables or other intermediate information during execution of instructions by processor 202. System 200 also comprises a read only memory (ROM) and/or other static storage device 206 coupled to bus 201 for storing static information and instructions for processor 202, and a data storage device 207 such as a magnetic disk or optical disk and its corresponding disk drive. Data storage device 207 is coupled to bus 201 for storing information and instructions. This may be used for storage of the databases to be described here which maintain information about currently defined problem descriptions using commercially available software products.

System 200 may further be coupled to a display device 221, such as a cathode ray tube (CRT) or liquid crystal display (LCD) coupled to bus 201 for displaying information to a computer user. Such a display 221 may further be coupled to bus 201 via a frame buffer 210, which information such as a single or multiple frames or images for display upon display device 221. An alphanumeric input device 222, including alphanumeric and other keys, may also be coupled to bus 201 for communicating information and command selections to processor 202. An additional user input device is cursor control 223, such as a mouse, a trackball, stylus, or cursor direction keys, coupled to bus 201 for communicating direction information and command selections to processor 202, and for controlling cursor movement on display 221.

Note, also, that any or all of the components of system 200 and associated hardware may be used in various embodiments, however, it can be appreciated that any configuration of the system may be used for various purposes according to the particular implementation.

In one embodiment, system 200 is one of the Sun Microsystems® brand family of workstations such as the SPARCstation brand workstation manufactured by Sun Microsystems® of Mountain View, Calif. Processor 202 may be one of the SPARC brand microprocessors manufactured by Sun Microsystems® of Mountain View, Calif. (Sun Microsystems® of Mountain View, Calif.).

Note that the following discussion of various embodiments discussed herein will refer specifically to a series of routines which are generated in a high-level programming language (e.g., the C or C++ language) and compiled, linked, and then run as object code in system 200 during run-time, for example by the SPARCompiler available from Sun Microsystems® of Mountain View, Calif. Specifically, the present invention may be operative in conjunction with certain software libraries, such as the Solaris® threads package available from SunSoft, Inc. of Mountain View, Calif. (Sun, Sun Microsystems and Solaris are trademarks of Sun Microsystems of Mountain View, Calif. SPARC and SPARCstation are trademarks of SPARC International, Inc. and are licensed exclusively to Sun Microsystems). It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 3:
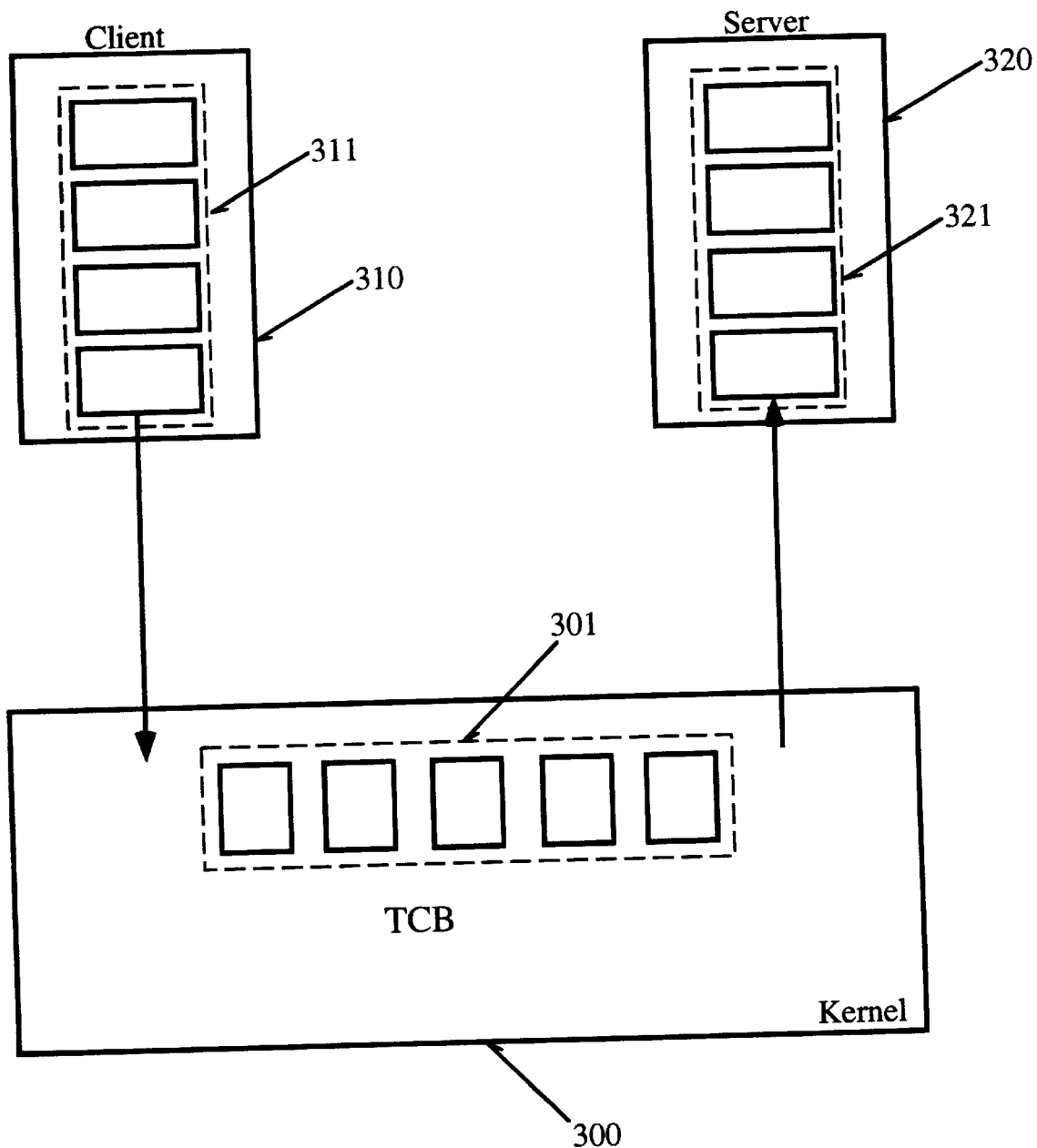
FIG. 3 illustrates a block diagram of processes in a computer system, and the buffers allocated for each of the processes.

A summary of implemented embodiments of the present invention will be described with reference to the remaining figures. In one embodiment of the present invention, inter-process communication is provided by means of a shared buffer space between two processes. In one example, the processes may be the client and kernel and in another circumstance, the processes may be a kernel and a server process. In this manner, communication, such as the passing of arguments during calls between a client and a server process may be provided using the mechanisms to be described here. In a system having a client process, kernel and server, two buffer areas are used for providing communication between the client and server. This is graphically illustrated with reference to FIGS. 3 and 4. As is shown in FIG. 3, the client process 310 allocates a plurality of buffers (approximately 5 kilobytes each) which are used for communication between client process 310 and kernel process 300. Similarly, kernel 300 and server 320 communicate via a plurality of similarly-sized buffers 321. Additional buffers are allocated for communication between the client/kernel and kernel/server on an "as needed" basis. Thus, unlike the prior art, which allocated a buffer within a first process, and maintained the allocated state of the buffer for the duration of the call (typically, until a return from the call), implemented embodiments of the present invention cause a receiving process to deallocate a buffer upon receipt of the information from the calling process. This is graphically illustrated with reference to FIG. 4.

Figure 4:
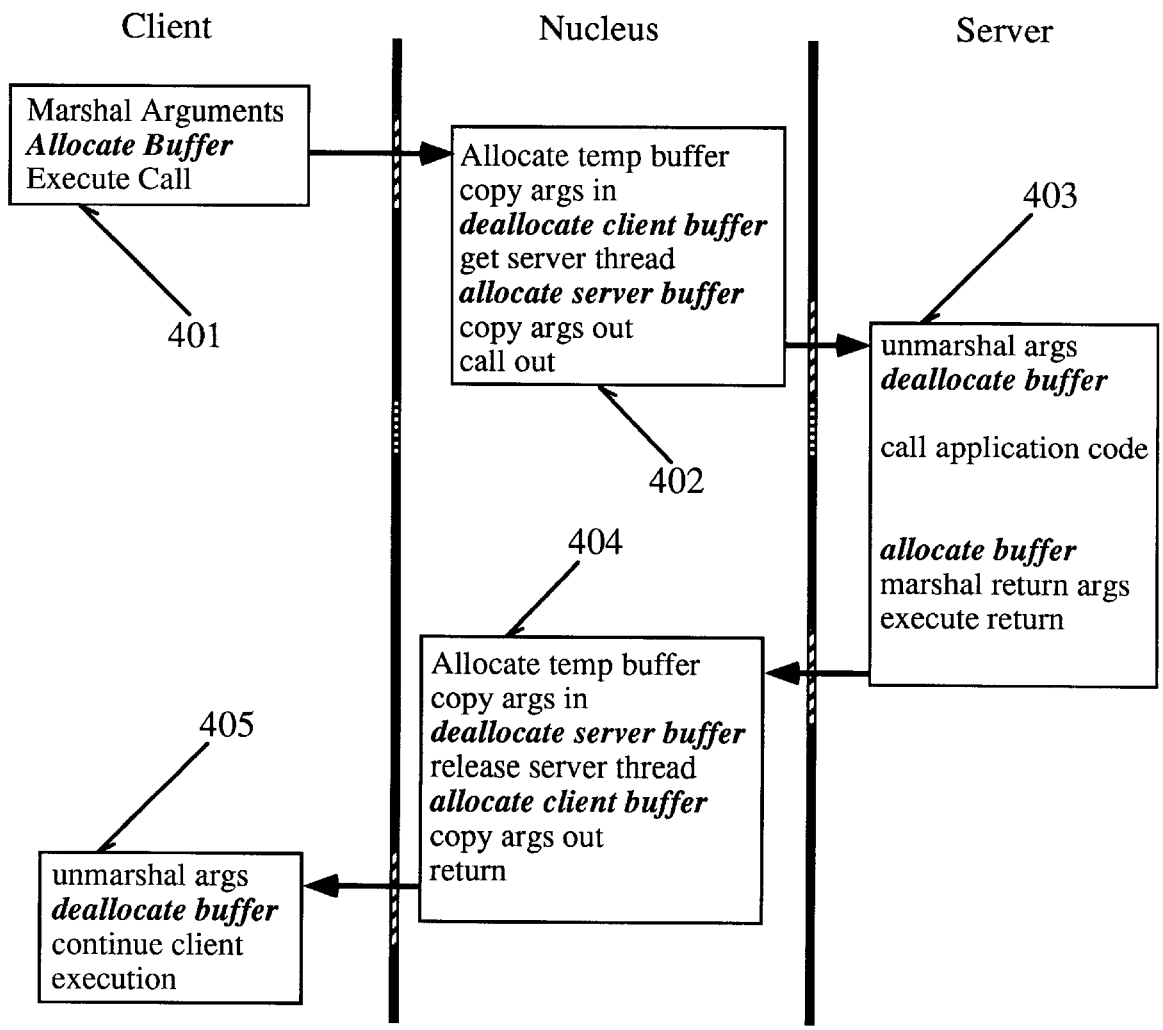
FIG. 4 illustrates a sequence of steps within a client, kernel and server process in implemented embodiments of the present invention.

For example, as illustrated in FIG. 4, a first process (e.g., 310 shown in FIG. 3) marshals its arguments upon a call to an external process, allocates the buffer and then executes the call to the external process. This is shown at step 401 in FIG. 4. In some circumstances, the external process is referred to as "remote," that is, it does not have access to the address space of the first process (client) and vice-versa. The remote process may be resident either in a local processor or computer system's memory or on a remote processor in a remote computer system in a distributed environment. Upon detection of the call by kernel routine 300 (a.k.a. "nucleus") illustrated in FIG. 3, a temporary buffer is allocated (e.g., 301 of FIG. 3) in order to receive the arguments passed by the client. Upon copying of the arguments from the client buffer into the temporary buffer within the kernel, the client buffer is then deallocated. Thus, instead of maintaining the allocated state of the client buffer for the duration of the call, the client buffer is only used until such time as the kernel has received and copied in the relevant arguments.

Upon copying of the relevant arguments in the kernel, the kernel obtains a server thread for a second process to which the arguments will be passed, and appropriate buffers are allocated for communication between the kernel and the server (e.g., 321 of FIG. 3). The arguments are copied from the temporary buffer into the server buffer, and control is then passed to server process 320. This is illustrated with reference to 402 of FIG. 4. Upon detection of the call by server process 320, the server then receives and unmarshals the arguments from the server buffer 321. At that time, the server can then deallocate its server/kernel buffer 321, and execute as illustrated in step 403 of FIG. 4.

Upon completion of execution of the server process, the server buffer is allocated and the arguments for return to the client procedure may then be marshaled. Then, the return arguments are marshaled into the server/kernel buffer 321, and a return from the server process 320 occurs. Upon detection of the return by the kernel 300, the temporary buffer is again allocated within the kernel, return arguments are copied in, and the server buffer 321 is then deallocated. The kernel can then release the server thread, and allocate the client buffer for communication between the kernel 300 and the client 310. At this point, the kernel then copies the arguments back into to client/kernel buffer 311 at step 404, and a return of control to client 310 is made. Upon detection of the return of control to the client from the kernel at step 405, the client unmarshals the arguments contained within the buffer, and the buffer is deallocated. Then, the client may continue execution after the return of the return arguments from the server process 320. The buffer 321 is again ready for the next thread.

Thus, buffers providing communication between the client and the server are dynamically allocated, on an "as needed" basis. Once the buffer is no longer required for communication between the two processes, it is deallocated via clearing of an "allocated buffer" flag. This is in contrast to the prior art which waits for a return from a second process (e.g., the server) until a buffer is deallocated. In multithreaded environments, such as those in common use in modern computer systems, the allocation of separate buffers for each call thread and the maintenance of these buffers during the call in an allocated state, consumes large amounts of memory resources. Typically, in such prior art circumstances, for the duration of the call to the server process these buffers are unused. Thus, the present invention provides a more efficient means for inter-process communication by avoiding the consumption of large amounts of memory by the allocation of buffers for multiple threads which are not required during execution of the second process (e.g., server process 320). Thus, implemented embodiments of the present invention use memory much more efficiently than such inter-process communication in the prior art.

Figure 5:
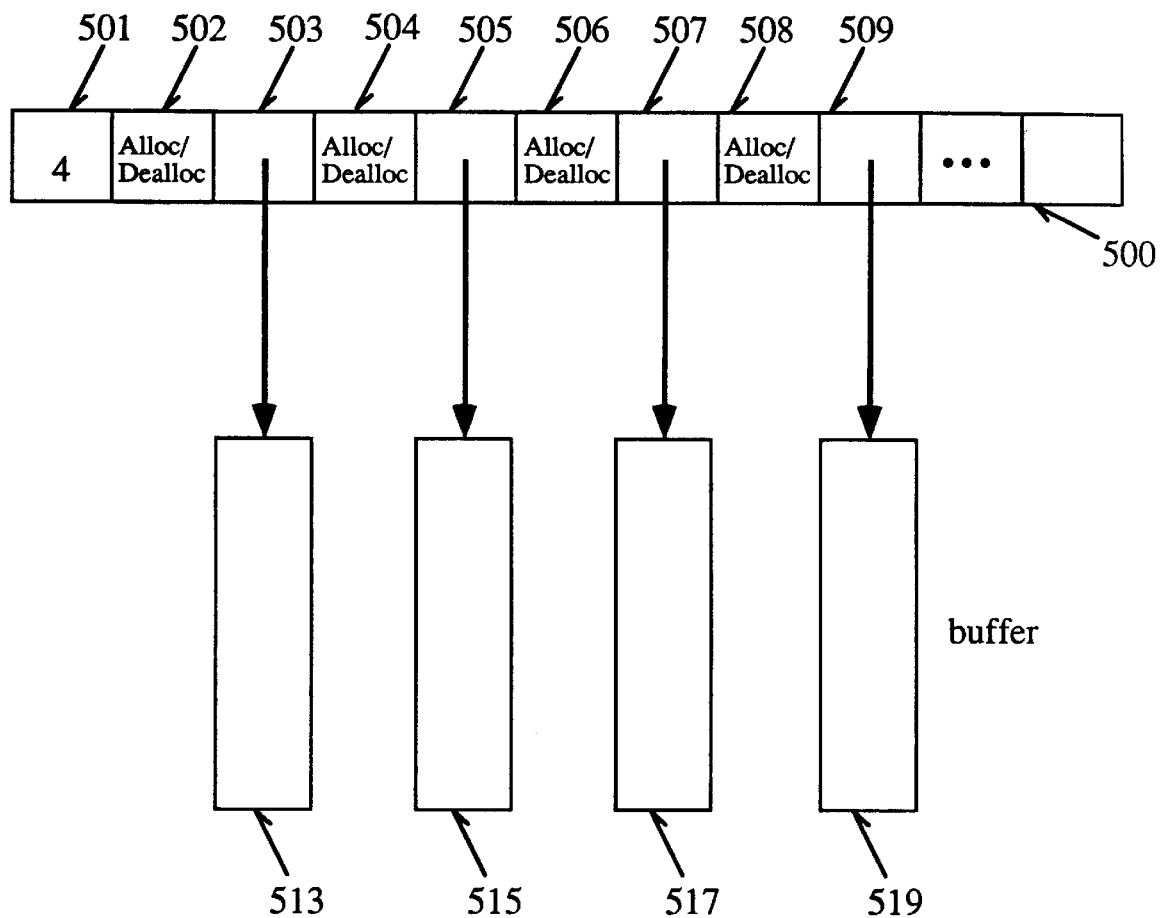
FIG. 5 shows a detailed structure of a buffer used for inter-process communication.

Implemented embodiments of the present invention use a data structure such as that illustrated in FIG. 5. 500 of FIG. 5 is a control area. It may be a client/kernel control area (or a kernel/server or other communication area). This area provides the necessary communication between two processes. 500 references a plurality of pre-allocated buffers 513–519 via pointers which are accessed by either communicating process. These are the buffer areas in which data is actually stored by the client, kernel or server processes during the inter-process communication. Control area 500 comprises a first field 501 which contains an integer value representing the number of buffers currently allocated. In the example shown in FIG. 5, 501 contains the integer value 4, indicating that 4 buffer areas (513, 515, 517 and 519) are currently allocated. In implemented embodiments of the present invention, field 501 may contain a maximum value of 32 (referencing a maximum of 32 buffers), however, this is merely a matter of design choice and either fewer or greater than 32 buffers may be used.

Control area 500 also contains allocation flags indicating whether a given buffer area is currently allocated or not. As illustrated in the figure, fields 502, 504, 506, 508 contain "alloc/dealloc" flags indicating whether the next field (a pointer or reference) points to a buffer or memory area which is currently allocated to a thread. Fields 503, 505, 507, 509, etc. are the pointers or references to the buffers themselves and corresponds with the alloc/dealloc flags in the preceding field. For example, the value of a flag contained in field 502 indicates whether the buffer 513 referenced by the pointer contained in field 503 is presently allocated or deallocated. Each of the buffers 513–519 comprise a small memory area, typically, in implemented embodiments of the present invention, 5 kilobytes. Buffer areas are allocated on an "as needed" basis by either the client, kernel or server process, by examining the field 501 to detect whether there are any available buffers referenced by the control area, and by examining each alloc/dealloc flag (e.g., 502, 504, etc.) to determine whether the specific buffer being examined is available for use.

Figure 8:
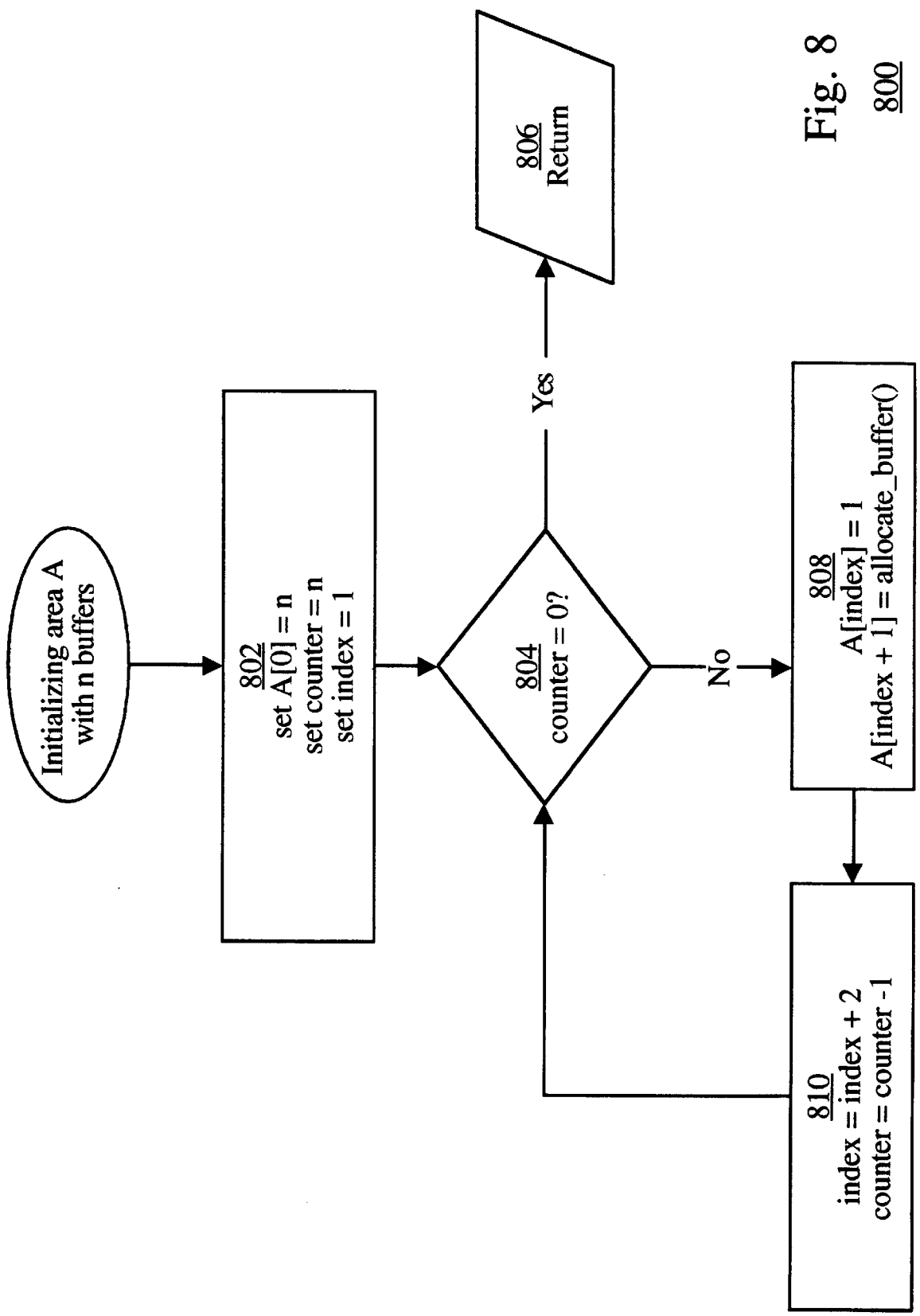
FIG. 8 shows a method for allocating memory for inter-process communication.

Upon initialization of a client process (e.g., 310 of FIG. 3), the control area 500 is allocated for use during any communication from a first process (e.g., a client) to a second process (e.g., the kernel 300). The actual memory space used for each of the buffers is also allocated from the operating system on an "as-needed" basis if the current number of buffers in use is not sufficient for all the threads which are being created. In an alternative embodiment, as illustrated in FIG. 8, memory for all n buffers (wherein n=32) may be allocated at once (e.g., upon entry into the client process or first creation of a thread).

Figure 6:
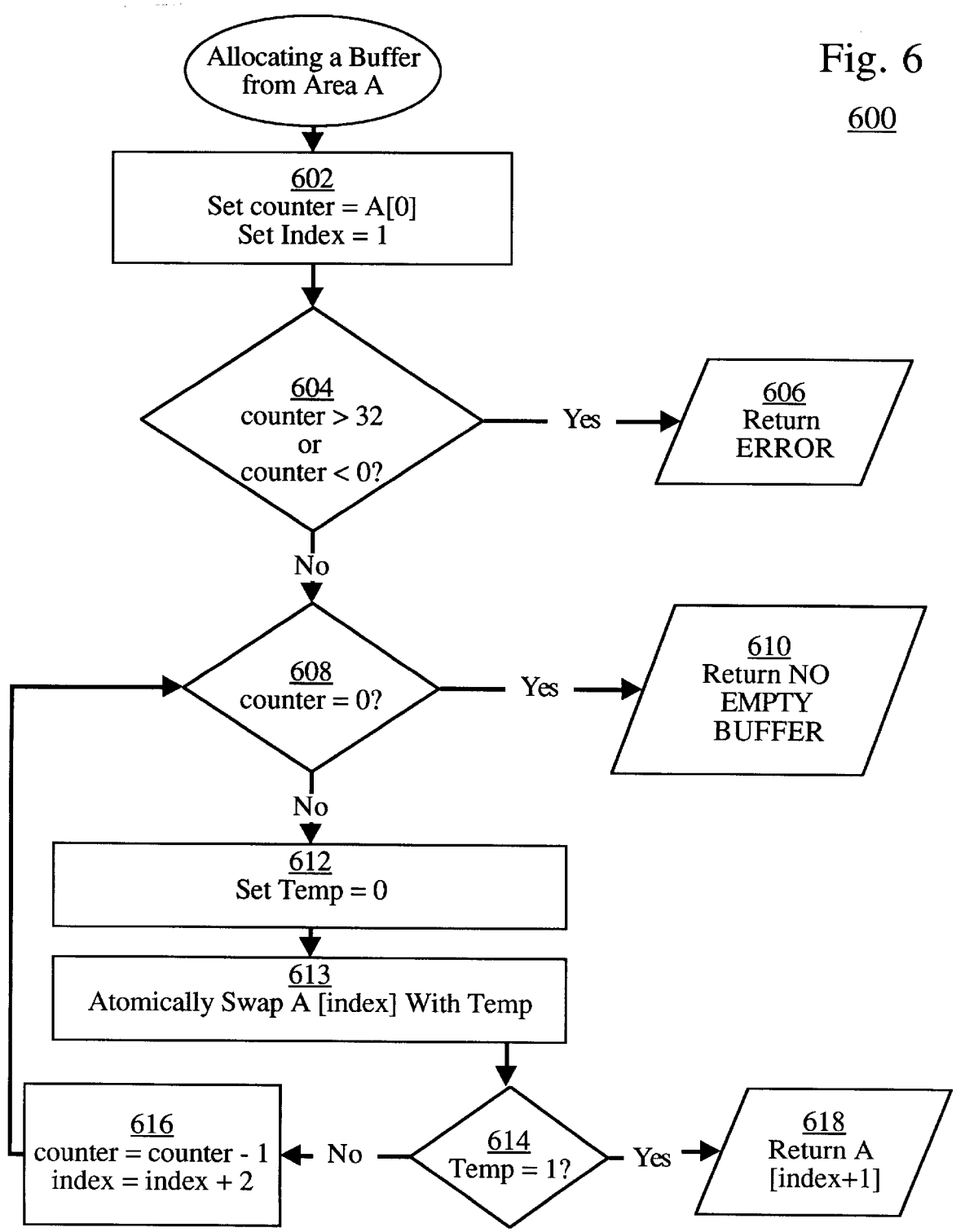
FIG. 6 shows a flowchart of a method used for allocating a buffer from a specified area used for communicating between two processes.

Upon detection of a call to a second procedure, the buffer(s) may then be allocated in the manner as described with reference to FIG. 6 below. This process may be performed when the client, kernel or server allocates buffers for passing arguments to and from a communicating process. In one embodiment of the present invention, the buffers may always be used during the call of a second process. In another embodiment, the client may determine whether it requires more than an minimal amount of memory (e.g., 128 bytes) prior to using any of the shared buffers.

In either event described above, process 600 commences at step 602 which initially sets the counter equal to the first element in the array A[0] such as element 501 of FIG. 5. An index is initialized to 1. Then, it is detected at step 604 whether the counter is out of the specified range between 0 and 32, wherein 32 is the maximum number of buffers allowed. If so, then an error is returned from the allocation process at step 606. If not, then, at step 608 it is detected whether the counter is exactly equal to 0. This indicates that there are no free buffers currently available for the thread to be created, and the process will return at step 610, indicating that no empty buffers are available for allocation at this time. In this instance, the process may either abort, wait until a buffer becomes available or allocate a second memory area including buffer(s).

Continuing with process 600, if the counter is not out of its range as detected at step 604, or is not precisely equal to 0 as detected at step 608, then, at step 612 a temporary value is set equal to 0. In the convention used in these illustrated embodiments, an integer zero (0) contained in one of the fields 502, 504, etc., indicates that the buffer pointed to by the associated pointer in the control area 500 has been allocated. An integer 1 in the field indicates that the buffer has not been allocated. At step 612, a temporally variable TEMP is set equal to 0. Then, at step 613, the allocation flag contained within A[index] is atomically swapped with TEMP, clearing the allocation flag. In implemented embodiments of the present invention, an "atomic swap" operation such as that available on the SPARC brand microprocessor is used. This operation is performed atomically, that is, without allowing any intervening interrupts, deferred traps or other thread in the system to access the allocation flag A[index]. In this way, any other processes accessing the area will be locked out until the value has been swapped. Atomic swaps are described, for example, in *SPARC Architecture Manual*, (version 8, 1992) 102–103 (available from SPARC International, Inc. of Menlo Park, Calif.).

Then, at step 614, it is detected whether the value retrieved from the alloc/dealloc field now the TEMP variable (or a register), at step 614 equals 1. If so, then the buffer is available for allocation, and the pointer to the buffer is returned to the requesting process at step 618. If not, then the counter is decremented at step 616, and the index is incremented by 2 to examine the next alloc/dealloc flag. Steps 608–616 continue until an available buffer is detected by checking the alloc/dealloc flags for each of the buffers referred to by the control area. Thus, allocation of a buffer from a specified communication area for communication between two processes (e.g., client/kernel or kernel/server) may be easily performed. This process is especially useful for the allocation steps described above with reference to FIG. 4.

Figure 7:
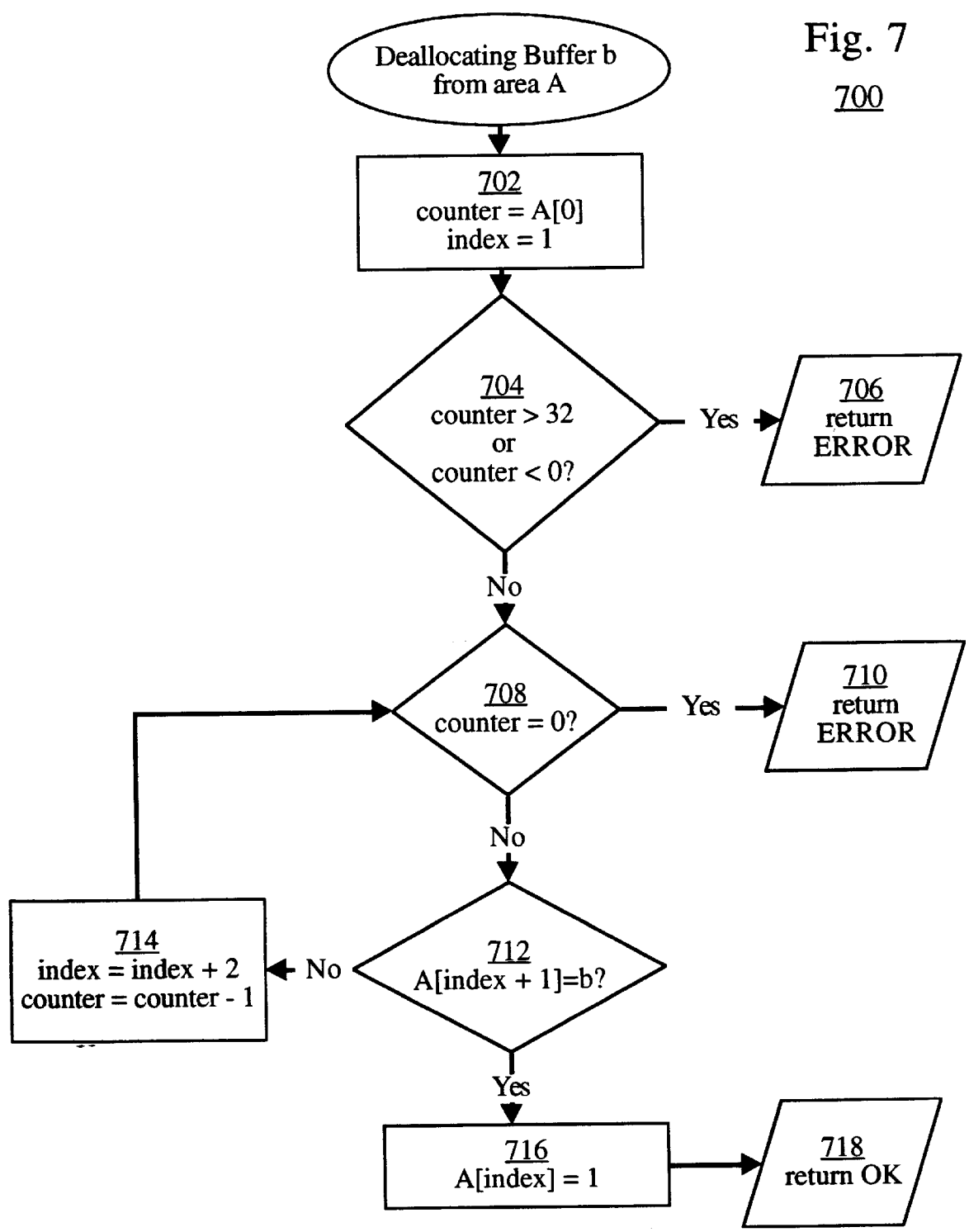
FIG. 7 shows a flowchart of a method for deallocating a buffer from a specified area for communicating between two processes.

The deallocation of a buffer is described with reference to process 700 of FIG. 7. The deallocation process proceeds in a similar manner at steps 702–708 to process 600 initially receiving a pointer b to the buffer, and retrieving the number of allocated buffers A[0] and initializing an index to 1 at step 702. At step 704, it is checked whether the counter is in range and, if not, a return from the process with an error occurs at step 706. At step 708 it is detected whether there are any remaining non-allocated buffers referenced by the control area. If not, that is, the counter equals 0, then an error is returned at step 710. At step 712 it is determined whether the buffer pointed to by the reference in the control structure is equal to the pointer b to the buffer sought to be deallocated. If so, then the associated allocation flag A[index] is set equal to 1, indicating that the buffer is now deallocated and available for use for other processes. The process then returns at step 718 with a return argument indicating that the operation completed successfully (e.g., OK). If the associated pointer does not point to the buffer sought to be deallocated as detected at step 712, then the index is incremented by 2 and the counter is decremented by 1 at step 714. Steps 708–714 iterate until the buffer sought to be deallocated is determined at step 712 or there are no remaining buffers sought to be examined at step 708 (counter=0).

Finally, the last process to be discussed is the initialization of the shared memory area between two processes (referred to as memory area A in process flowchart 800 of FIG. 8) in one embodiment of the present invention, such as that for communication between the client and the kernel or between the kernel and a server process. Again, as previously discussed, allocation of all n buffers may be done upon entry into the client process, or each buffer may have memory separately allocated as demand requires. As shown in FIG. 8, at step 802, the number of available buffers in the first element (e.g., 501) of the control area 500 A[0] is set equal to n. In implemented embodiments, n=32, however, any number of buffers may be used according to design choice. Then, a corresponding counter is also set equal to n, and an index variable is set equal to 1. Then, step 804 detects whether memory for all n buffers has been allocated from the operating system. If not, the process 800 proceeds to step 808. At step 808, the allocation flag for the associated buffer is set equal to 1, indicating that it is available for use. In addition, the associated reference to the buffer A[index]+1 is set equal to a memory allocation primitive such as one entitled allocate_buffer ( ) in certain operating systems. In this example, the function allocate_buffer may allocate a memory region of 5 kilobytes in length, however, the size of the buffer may be any value according to design choice.

Upon indication of the availability of the buffer and allocation of appropriate memory for the buffer at step 808, the index is incremented by 2, and the counter is decremented by 1. The process steps 804–810 iterate until it is detected that the total number n of buffers has been allocated an appropriate space in a shared memory region between the two processes such as the client and kernel or the kernel and server (when the number of buffers allocated equals n). Upon detection that the counter has then equaled 0 at step 804, then the process is complete and returns at step 806.

Thus, using the foregoing techniques, a control area and buffers for communication between two processes may be created and used for inter-process communication. Note that the present invention is especially useful in circumstances wherein several process threads may be active at any given time, thus making memory usage much more efficient than that provided in the prior art. Although a number of very specific embodiments with reference to the present invention have been described, particularly with reference to the above figures, it can be appreciated by one skilled in the art that modifications may be made without departing from the overall spirit and scope of the present invention. Thus, the present invention is to be construed as limited only by the appended claims which follow.

What is claimed is:

1. A computer-implemented method in a computer system of inter-process communication comprising the following steps:
   a. a client procedure allocating a first buffer in a first memory space shared by said client procedure and a kernel procedure;

b. said client procedure marshaling arguments for said calling of a remote procedure in said first buffer;

c. said client procedure calling said remote procedure via said kernel procedure and passing a first reference to said first buffer in said first memory space to said kernel procedure;

d. said kernel procedure detecting said call of said remote procedure by said client procedure and allocating a second buffer in a second memory space shared by said kernel procedure and said server procedure;

e. said kernel procedure referencing said first buffer and copying said arguments contained in said first buffer into said second buffer;

f. said kernel procedure deallocating said first buffer;

g. said kernel procedure calling said remote procedure and passing a second reference to said second buffer to said remote procedure;

h. said remote procedure detecting said calling of said remote procedure and unmarshaling said arguments in said second buffer;

i. said remote procedure deallocating said second buffer and executing wherein said kernel procedure initiates said deallocation of said first buffer:
(1) upon completion of said copying of said arguments from said first buffer to said second buffer; and,
(2) before a communication is returned from said kernel procedure, j. upon completion of execution of said remote procedure, said remote procedure allocating a third buffer in said second memory space;

k. said remote procedure marshaling return arguments in said third buffer for returning from said remote procedure;

l. said remote procedure returning and passing a third reference to said third buffer to said kernel procedure;

m. said kernel procedure detecting said return of said remote procedure and allocating a fourth buffer in said first memory space;

n. said kernel procedure copying said return arguments contained in said third buffer into said fourth buffer;

o. said kernel procedure deallocating said third buffer;

p. said kernel procedure returning to said client procedure and passing a reference to said fourth buffer to said client procedure;

q. said client procedure detecting said returning to said client procedure and unmarshaling said arguments in said fourth buffer; and r. said client procedure deallocating said fourth buffer and continuing execution, wherein said first memory space is preallocated, prior to said calling of said remote procedure by said client procedure, to contain a buffer, a buffer pointer, and an allocation flag where said buffer pointer contains an address of said buffer and said allocation flag contains a value representing one of an allocated state and a deallocated state for said buffer.

2. The method of claim 1 wherein said buffer may be allocated by said client procedure or said kernel procedure by checking said allocation flag to identify a deallocated buffer and setting said allocation flag to said allocated state.

3. The method of claim 2 wherein said checking said allocation flag by said client procedure or said kernel procedure comprises performing an atomic swap between said allocation flag and a value representing said allocated state and checking to see if the allocation flag contained a value representing said deallocated state prior to said atomic swap.

4. A computer-implemented method in a computer system of inter-process communication comprising the following steps:

a. a first procedure allocating a first buffer in a first memory space shared by said first procedure and a second procedure;

b. said first procedure marshaling arguments for communicating with said second procedure in said first buffer;

c. said first procedure indicating a message for said second procedure and passing a first reference to said first buffer in said first memory space to said second procedure;

d. said second procedure detecting said indicating of said message by said first procedure;

e. said second procedure referencing said first buffer and copying said arguments contained in said first buffer into a temporary buffer;

f. said second procedure deallocating said first buffer upon completion of said copying of said arguments contained in said first buffer by said second procedure and before a communication is returned from said second procedure, g. said second procedure processing said arguments contained in said temporary buffer;

h. upon completion of processing said arguments, said second procedure allocating a second buffer in said first memory space;

i. said second procedure marshaling return arguments in said second buffer for returning from said second procedure;

j. said second procedure returning and passing a second reference to said second buffer to said first procedure;

k. said first procedure detecting said returning to said first procedure and unmarshaling said arguments in said second buffer; and l. said first procedure deallocating said second buffer and continuing execution, wherein said first memory space is preallocated, prior to said calling of said second procedure by said first procedure, to contain a buffer, a buffer pointer, and an allocation flag where said buffer pointer contains an address of said buffer and said allocation flag contains a value representing one of an allocated state and a deallocated state for said buffer.

5. The method of claim 4 wherein said buffer may be allocated by said first or said second procedure by checking said allocation flag to identify a deallocated buffer and setting said allocation flag to said allocated state.

6. The method of claim 5 wherein said checking said allocation by said first procedure or said second procedure comprises performing an atomic swap between said allocation flag and a value representing said allocated state and checking to see if the allocation flag contained a value representing said deallocated state prior to said atomic swap.

7. A computer system implementing a method of inter-process communication comprising the following steps:

a. a first procedure allocating a first buffer in a first memory space shared by said first procedure and a second procedure;

b. said first procedure marshaling arguments for communicating with said second procedure in said first buffer;

c. said first procedure indicating a message for said second procedure and passing a first reference to said first buffer in said first memory space to said second procedure;

d. said second procedure detecting said indicating of said message by said first procedure;

e. said second procedure referencing said first buffer and copying said arguments contained in said first buffer into a temporary buffer;

f. said second procedure deallocating said first buffer upon completion of said copying of said arguments contained in said first buffer by said second procedure and before receiving a communication from said second procedure, g. said second procedure processing said arguments contained in said temporary buffer;

h. upon completion of processing said arguments, said second procedure allocating a second buffer in said first memory space;

i. said second procedure marshaling return arguments in said second buffer for returning from said second procedure;

j. said second procedure returning and passing a second reference to said second buffer to said first procedure;

k. said first procedure detecting said returning to said first procedure and unmarshaling said arguments in said second buffer; and l. said first procedure deallocating said second buffer and continuing execution, wherein said first memory space is preallocated, prior to said calling of said second procedure by said first procedure, to contain a buffer, a buffer pointer, and an allocation flag where said buffer pointer contains an address of said buffer and said allocation flag contains a value representing one of an allocated state and a deallocated state for said buffer.

8. The computer system implementing the method of claim 7 wherein said buffer may be allocated by said first or said second procedure by checking said allocation flag to identify a deallocated buffer and setting said allocation flag to said allocated state.

9. The computer system implementing the method of claim 8 wherein said checking said allocation flag by said first procedure or said second procedure comprises performing an atomic swap between said allocation flag and a value representing said allocated state and checking to see if the allocation flag contained a value representing said deallocated state prior to said atomic swap.

10. A computer system comprising:

a. a first allocation circuit for allocating a first buffer in a first memory space shared by a first procedure and a second procedure;

b. a first marshaling circuit for enabling said first procedure to marshal arguments for communicating with said second procedure in said first buffer;

c. a first message indication circuit for indicating a message from said first procedure to said second procedure and passing a first reference to said first buffer in said first memory space to said second procedure;

d. a first message detection circuit for enabling said second procedure to detect said indicating of said message by said first procedure;

e. a first referencing circuit for enabling said second Procedure to reference said first buffer and copy said arguments contained in said first buffer into a temporary buffer;

f. a first deallocation circuit for enabling said second procedure to deallocate said first buffer operative upon completion of said copying of said arguments contained in said first buffer into said temporary buffer and before receiving a communication from said second procedure, g. a processing circuit for enabling said second procedure to process said arguments contained in said temporary buffer;

h. a second allocation circuit operative upon completion of processing said arguments, for enabling said second procedure to allocate a second buffer in said first memory space;

i. a second marshaling circuit for enabling said second procedure to Marshall return arguments in said second buffer for returning from said second procedure;

j. a return circuit for enabling said second procedure to return and pass a second reference to said second buffer to said first procedure;

k. a second detection circuit for enabling said first procedure to detect said return to said first procedure and unmarshal said arguments in said second buffer;

l. a second deallocation circuit for enabling said first procedure to deallocate said second buffer and continue execution, wherein said first memory space is preallocated, prior to said calling of said second procedure by said first procedure, to contain a buffer, a buffer pointer, and an allocation flag where said buffer pointer contains an address of said buffer and said allocation flag contains a value representing one of an allocated state and a deallocated state for said buffer.

11. The computer system of claim 10 wherein said buffer may be allocated by said first or said second procedure by checking said allocation flag to identify a deallocated buffer and setting said allocation flag to said allocated state.

12. The computer system of claim 11 wherein said checking said allocation flag by said procedure or said second procedure comprises performing an atomic swap between said allocation flag and a value representing said allocated state and checking to see if the allocation flag contained a value representing said deallocated state prior to said atomic swap.

* * * * *